Figure 1:
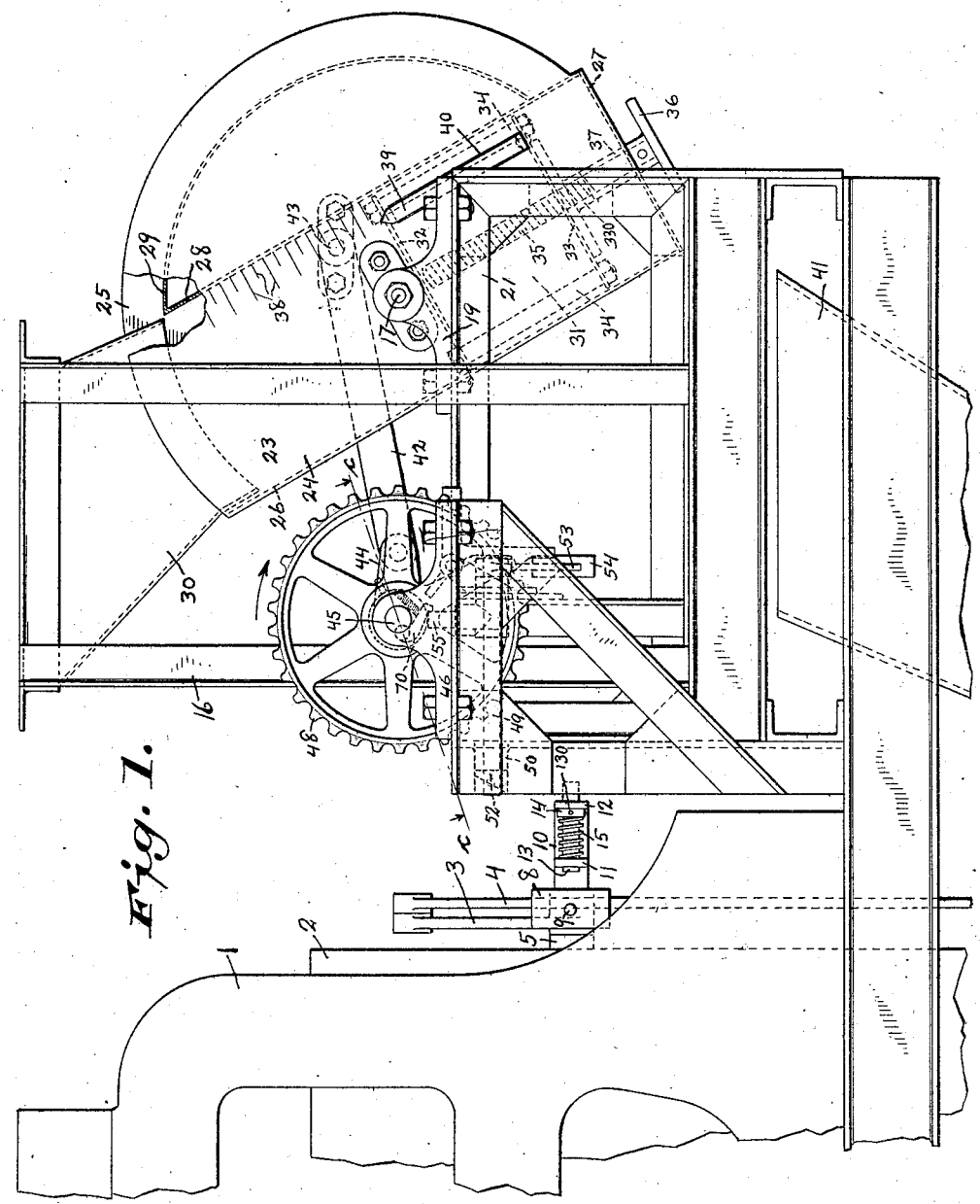

H. W. WELSH.
MEASURING APPARATUS.
APPLICATION FILED AUG. 28, 1911.

1,011,540.

Patented Dec. 12, 1911.

3 SHEETS—SHEET 1.

Witnesses:
Fred Palm
Frank E. Dennett

Inventor
Henry William Welsh
By Flanders Bottum Fawsett & Bottum
Attorneys.

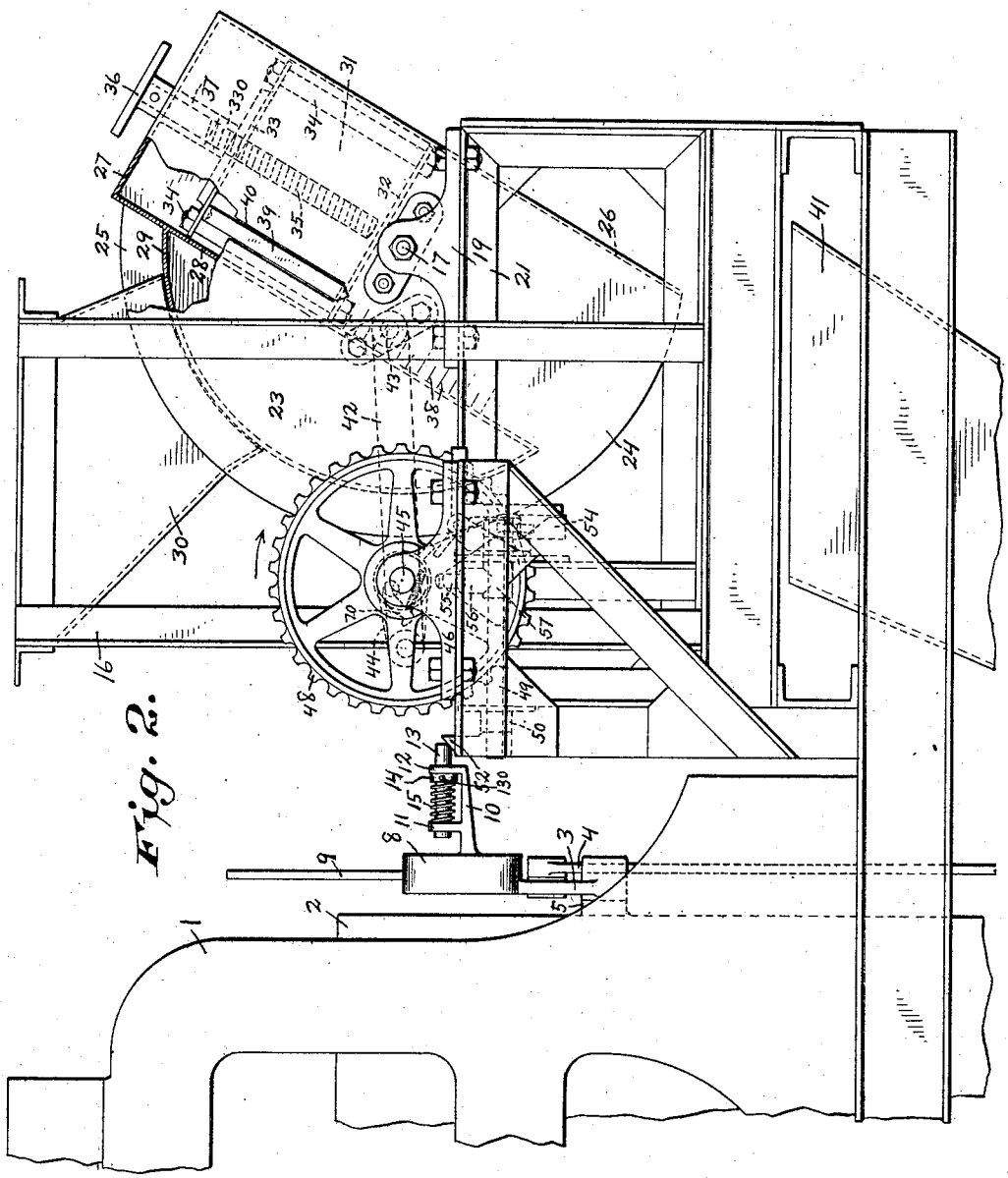

H. W. WELSH.
MEASURING APPARATUS.
APPLICATION FILED AUG. 28, 1911.
1,011,540.
Patented Dec. 12, 1911.
3 SHEETS—SHEET 3.
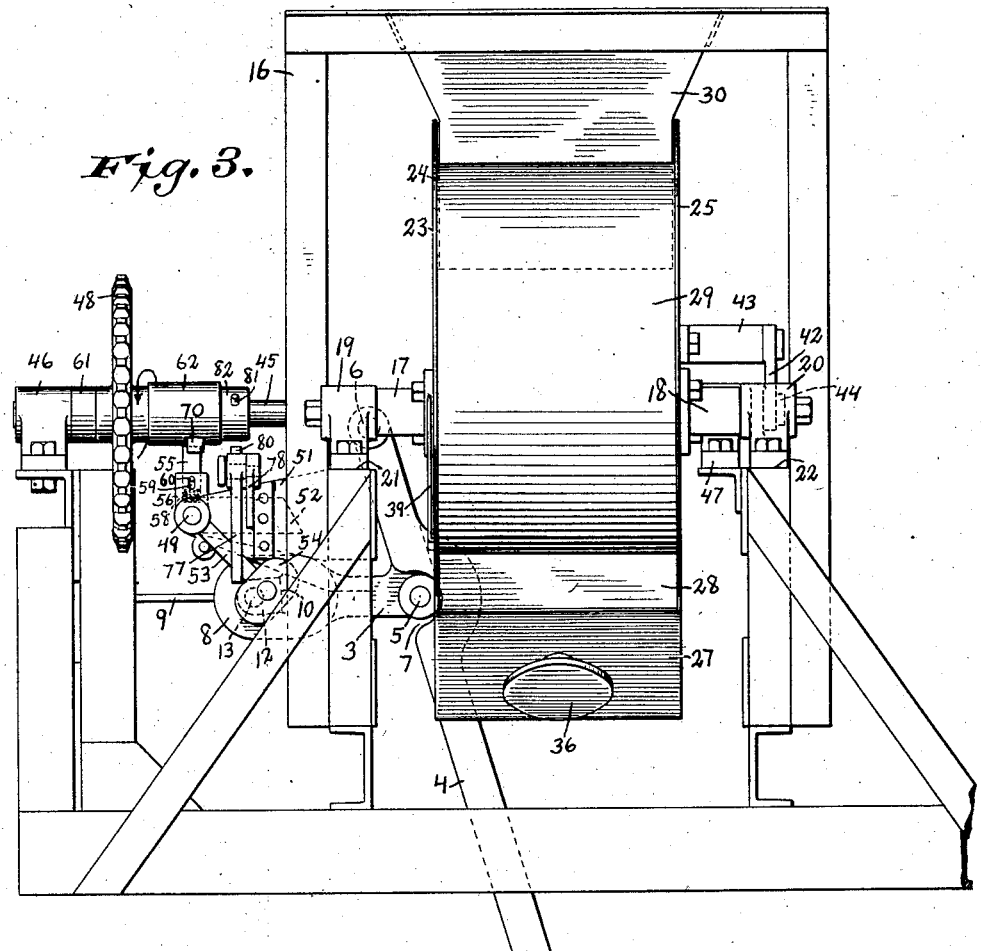
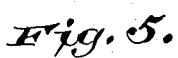
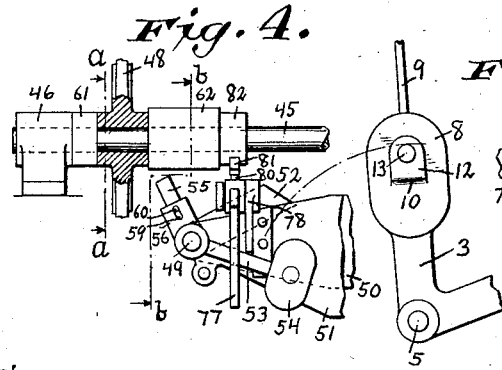
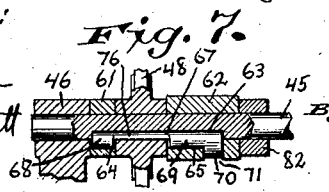
Witnesses:
Fred Palm
Frank E. Dennett
Inventor
Henry William Welsh
By Handers Bottum Fawsett & Bottum
Attorneys.
COLUMBIA PLANOGRAPH CO., WASHINGTON, D. C.

UNITED STATES PATENT OFFICE.

HENRY WILLIAM WELSH, OF NORTH MILWAUKEE, WISCONSIN, ASSIGNOR TO THE AVERY SCALE COMPANY, OF NORTH MILWAUKEE, WISCONSIN, A CORPORATION OF WISCONSIN.

MEASURING APPARATUS.

1,011,540.   Specification of Letters Patent.   Patented Dec. 12, 1911.

Application filed August 28, 1911. Serial No. 646,357.

*To all whom it may concern:*

Be it known that I, HENRY WILLIAM WELSH, a subject of the King of Great Britain, residing at North Milwaukee, in the county of Milwaukee and State of Wisconsin, have invented certain new and useful Improvements in Measuring Apparatus, of which the following is a specification, reference being had to the accompanying drawing, forming a part thereof.

This invention relates to measuring apparatus, and the objects of the invention are to provide a measuring apparatus which is capable of being operated automatically to receive and measure charges of material and to discharge the several measured charges at predetermined intervals.

A special use and application of the measuring apparatus disclosed herein is in combination with automatic, self-discharging, weighing scales, and the apparatus may be used for many different purposes, only one of which will be referred to herein, towit: that of supplying measured quantities of gypsum to weighed charges of clinker in the manufacture of cement. In the manufacture of certain cements it is desirable to add definite proportions of gypsum to the clinker mass, and the apparatus described and claimed herein is particularly suited for such purpose.

The measuring apparatus described in this specification and illustrated by the drawings accompanying the same, will be described as combined with and operated by a well known type of automatic weighing scale which is well known upon the market and therefore does not of itself require an extended description.

Referring to the drawings which accompany this specification and form a part thereof, on which drawings the same reference characters are used to designate the same elements wherever they may appear in each of the several views and which drawings illustrate an embodiment of this invention, Figure 1 is a side elevation of the measuring apparatus, a part of the scale mechanism being shown, and a part of the apparatus being broken away to show more clearly the construction, the measuring apparatus being shown in the receiving or charging position; Fig. 2 is a view similar to Fig. 1, parts being broken away to show more clearly the construction and the measuring apparatus being shown in the discharging position; Fig. 3 is a rear elevation of the apparatus in the position shown by Fig. 1; Fig. 4 is an elevation of details, a part being shown in section; Fig. 5 is a vertical section taken on the line $a-a$ of Fig. 4, looking in the direction indicated by the arrows; Fig. 6 is a section and elevation taken on the line $b-b$ of Fig. 4, looking in the direction indicated by the arrows; and Fig. 7 is a section taken on the line $c-c$, Fig. 1, looking in the direction indicated by the arrows.

Referring specifically to the drawings, the reference numeral 1 designates the frame of an automatic weighing and dumping scale, 2 the hopper thereof, 3 the bell crank trip lever, and 4 the hopper closure supporting link. In the construction of the specific scales referred to, the bell crank trip lever 3 is pivoted to the hopper 2 by the pivot 5, and the hopper closure link 4 is pivoted to the bell crank trip lever 3 at its upper end by the pivot 6. The closure link 4 is provided with a recess 7 so that the pivots 5 and 6 and the pivot (not shown) which connects the closure link 4 with the closure (not shown) of the bottom of the hopper 2 may be brought into the same straight line to keep the bottom closure closed in the usual manner.

As hereinbefore stated, the specific structure of the weighing scale mechanism does not require extended description, but in the operation of the scale when the hopper 2 has received its weighed charge, the hopper 2 descends and the bell crank trip lever 3 is turned upon its pivot 5 to swing the closure link 4 away from pivot 5, so that the pivots hereinbefore mentioned will no longer lie in the same straight line and the closure of the hopper 2 will fall open by gravity. The bell crank trip lever 3 is provided with the weight 8 to return it to normal position after the contents of the hopper 2 have been discharged, and in the construction shown by the drawings this weight 8 is made an integral part of the bell crank trip lever 3, and a rod 9 projects therefrom, to be tripped by the tripping member (not shown) of the scale in the well known manner. In the specific construction shown by the drawings, the weight 8 is provided with a bracket 10 extending therefrom and provided with two lugs 11 and 12, which are bored to receive a rod 13 which is slidably supported in the bores of said lugs so that it can reciprocate lengthwise therein. A collar 14 is secured to the rod 13 by a pin 130, and limits the outward movement of the rod with respect to the lugs 11 and 12 and between lug 11 and collar 14 is interposed a spiral spring 15 which yieldingly holds the rod 13 in its extreme outward position, as clearly shown by Figs. 1 and 2 of the drawings. The rod 13 in the construction illustrated and described, is the member carried by the movable hopper 2 which during the movement of the hopper of the scale, sets into operation the measuring apparatus in the manner to be hereinafter described.

The frame 1 of the scale and the framework of the measuring apparatus, which is generally designated by the reference numeral 16, are illustrated as supported upon common supporting members, whereby their relative positions are maintained undisturbed.

The measuring apparatus comprises a box supported by journals 17 and 18 bolted to the sides thereof, which in turn are supported in journal bearings 19 and 20, secured to horizontal members 21 and 22 of the frame 16. The measuring box, which is denoted generally by the reference character 23, is composed of sides 24 and 25, a front wall 26, a bottom 27 and a rear wall 28. The sides 24 and 25 are made preferably of semi-circular form, as clearly shown by the drawings, and a plate 29, curved to a generally semi-circular form, is secured between the sides 24 and 25 and the rear wall 28 to serve as a valve or cut-off plate for the lower end of the supply hopper 30, as clearly shown by Figs. 1 and 2 of the drawings and in a manner which will be readily understood from an inspection of the drawings.

In order that the capacity or interior volume of the box 23 may be varied according to the requirements of the use of the apparatus, a false bottom 31 is placed therein, which is movable up and down in the box in the following manner: The movable bottom 31 is composed of two plates 32 and 33, which are held fast together but separated from each other, by bolts 34. A screw 35 extends through the bottom 27 of the box and is provided with the operating wheel 36 on the outside of the box, which is pinned thereto so that the screw can be rotated. A collar 37 secured to the unthreaded part of the screw on the inside of the box and bearing against the inside of the bottom of the box, coacts with the operating wheel on the outside of the box to prevent longitudinal movement of the screw with respect to the box. The top plate 32 of the false bottom is imperforate, but the lower plate 33 is provided with an apertured boss 330 which is screwthreaded to receive the screwthreads of screw 35, and it will be readily seen that by revolving the operating wheel 36 the false bottom 31 can be moved up or down within the box 23, thereby varying the capacity of the box for the material which it is to receive. The exterior of the box may be provided with marks 38 to indicate the free volume of the box in cubic inches or other designations, when the false bottom 31 occupies different positions within the box, a pointer 39 secured to the false bottom 31 and extending to the outside of the box through a slot 40, showing the position of the false bottom 31 or the free volume capacity of the box by its position with respect to marks 38, in a manner which will be readily understood. When the box 23 is tilted into the position shown by Fig. 1 of the drawings, material falls from the hopper 30 into the free space of the box, filling it completely. When now the box is tilted from the position shown by Fig. 1 of the drawings to the position shown by Fig. 2 of the drawings, the material contained in the box, or in other words, the measured charge of material, will fall out into the hopper 41, which will conduct the material, such as gypsum, for example, to the material, such as clinker, for example, discharged from the hopper 2 of the weighing scale, so that these materials will be delivered in definite proportions.

The box 23 is tilted back and forth upon its journals 17 and 18, by the connecting rod 42, which is pivoted at one end to the box 23 by pivot 43 and which is pivoted to the crank arm 44 at its opposite end, the said crank arm 44 being rigidly secured to the shaft 45 so as to be revolved by said shaft when said shaft is revolved. The shaft 45 is supported by journal boxes 46 and 47, as clearly shown by the drawings, and is adapted to be rotated by any suitable means, as for example, by the sprocket wheel 48, which is revolved continuously in the direction indicated by the arrows from any suitable source of power supply.

Before entering into a detailed description of the specific mechanism illustrated by the drawings for effecting the tipping and the consequent filling and emptying of the measuring box 23 at predetermined intervals, it may be explained that the general action and operation of the apparatus is for the sprocket wheel 48 to be continuously rotated in the direction indicated by the arrows by some power means, but without rotating the shaft 45 except when the sprocket wheel 48 is keyed or clutched to the shaft for the purpose of tilting the box 23 from the filling position to the discharging position and back again to the filling position, as the object of the combined operation of the weighing scale and the measuring apparatus is to discharge a measured quantity of material for each hopper load of material weighed and discharged by the scale.

Referring now to the specific clutch mechanism illustrated by the drawings for clutching the sprocket wheel 48 and shaft 45 together so that the shaft 45 will be revolved by the sprocket wheel, the reference numeral 49 designates a rock shaft supported by brackets 50 and 51. The rock shaft 49 is provided with a crank arm 52, pinned or keyed thereto, which, when the apparatus is in the position shown by Fig. 1 of the drawings, projects horizontally away from the observer and is in the path of the rod 13, so that when the rod 13 is moved upwardly during the downward movement of the hopper 2 and the discharge thereof, the rod 13 will contact with the crank arm 52 and turn the rock shaft 49 and the clutch stop to the positions shown by Fig. 4 of the drawings to permit sprocket wheel 48 and shaft 45 to be clutched together in the manner to be described. The end of the crank arm 52 is beveled outwardly and downwardly and this bevel and the spring 15 permit the rod 13 to move back longitudinally to pass the crank arm 52 as the rod 13 is moved down below crank arm 52 when the hopper 2 ascends to receive a fresh charge of material. The lever 53 is immovably secured to rock shaft 49 and has a weight 54 secured thereto to rock the rock shaft back to the position from which it had been rocked by the upward movement of rod 13. The clutch stop 55 is a pin which is received within a bore in the projection 56 of a collar 57 which is immovably secured to the rock shaft 49. The spring 58, slot 59 and pin 60 permit a slight lengthwise movement of the clutch stop 55 to allow for the slight eccentricity of the clutch arm but the spring 58 is stiffer than the clutch spring to be presently described. It should be noticed that the rock shaft 49 is placed at about a right angle with shaft 45 and as the rock shaft 49 is rocked the clutch stop 55 is swung parallel with shaft 45.

The reference numerals 61 and 62 designate collars on shaft 45 on opposite sides of sprocket wheel 48, and preferably these collars are immovably fastened to the shaft. Shaft 45 is provided with a semicylindrical bore 63 and collars 61 and 62 and sprocket wheel 48 are provided with semicylindrical bores 64, 65 and 66 respectively which, when in register with the semicylindrical bore 63 in the shaft, form a cylindrical bore extending lengthwise of shaft 45. The clutch, which is generally designated by the reference numeral 67, is received within the cylindrical bore so formed in the shaft 45, collars 61 and 62 and sprocket wheel 48. The clutch 67 is formed with cylindrical journal ends 68 and 69, a clutch arm 70 which projects out through a slot 71 in collar 62 and is provided with a stop lug 72 at its outer end. A spiral spring 73 seated in a bore 74 in the collar 62 and adjustable by the screw 75 pushes against the clutch arm 70 and normally holds the clutch arm 70 swung out and away from collar 62 in the positions shown by Figs. 5 and 6 of the drawings, which is the position occupied by the clutch when the shaft 45 and the sprocket wheel 48 are clutched together, as clearly shown by Fig. 5 of the drawings. The part 76 of the clutch 67 which extends from collar 61 to collar 62 through sprocket wheel 48 is reduced in thickness so as to fill the semicylindrical bore 63 in shaft 45 and complete the cylindrical cross section of said shaft when the clutch is turned to the proper position, in a manner which will be readily understood. The position referred to is the position which the part 76 of the clutch 67 occupies when the clutch arm 70 is pressed back and spring 73 is compressed by the clutch stop 55. In this position of the clutch the sprocket wheel 48 can rotate freely upon shaft 45 without rotating the shaft.

The clutch 67 may be readily assembled with the collars 61 and 62 and sprocket wheel 48 by providing a longitudinal slot in collar 62 extending from an end thereof to slot 71 for the passage of clutch arm 70 to slot 71. When the clutch 67 is seated in the semicylindrical bore 63 in shaft 45, the collar 62, sprocket wheel 48 and collar 61 can be slid onto the shaft and into position over clutch 67.

A gravity catch 77 is freely pivoted to a bracket 78 and is provided with an ordinary form of inclined catch 79 to hook under lever 53 and hold lever 53, rock shaft 49, crank arm 52 and clutch stop 55 in the positions into which they have been moved by the upward movement of rod 13. A pin 80 projects from the gravity catch 77 into the path of a pin 81 which projects from a collar 82 immovably secured to shaft 45, and preferably pin 81 is located on the opposite side of shaft 45 from the clutch arm 70, as clearly shown by Fig. 6 of the drawings. The function of pin 81 is to release catch 77 from lever 53 so that the weight 54 will drop and rock the rock shaft 49 to bring the clutch stop 55 into the path of rotation of clutch arm 70 and insure the unclutching of sprocket wheel 48 from shaft 45 after shaft 45 has made one complete revolution which tilts box 23 from the position shown by Figs. 1 and 3 of the drawings to the position shown by Fig. 2 and back to the position shown by Figs. 1 and 3, in other words, from the filling position to the discharging position and back to the filling position. The stop lug 72 on the clutch arm 70 prevents the clutch arm 70 from being forced by the clutch stop 55 without rotating the clutch 67 so as to free the sprocket wheel 48 from the shaft 45.

The operation of the apparatus is as follows: The adjustable false bottom of the box 23 is adjusted so that the proper quantity of material will be received within the box 23 for the charge of material weighed by a single movement of the hopper 2 of the scale. The parts being in the position shown by Figs. 1 and 3 of the drawings, the box 23 is filled with material from the hopper 30 by gravity. The hopper 2 of the scale is now being filled. The weight 54 is down and clutch stop 55 is in engagement with clutch arm 70. The clutch 67 is out of engagement with sprocket wheel 48 which is revolving freely on shaft 45 but all other parts shown by the drawings are stationary. The hopper 2 of the scale having now received its weighed charge, begins to fall. Rod 13 is moved upwardly and catching under crank arm 52 rocks the rock shaft 49, swinging clutch stop 55 to the left (Fig. 1) away from and out of the path of clutch arm 70, and raising weight 54 and lever 53 to be caught by catch hook 79 and retained in the position shown by Figs. 2, 4 and 6 of the drawings. As soon as the clutch stop 55 has been swung clear of the clutch arm 70, the spring 73 is free to revolve the clutch 67 by pushing the clutch arm 70 out and away. As soon as the semicylindrical bore 66 in the sprocket wheel 48 comes in register with the semicylindrical bore 63 in the shaft 45 the spring 73 rotates the clutch 67 so that the part 76 thereof extends into the semicylindrical bore 63 in the shaft and into the semicylindrical bore 66 in the sprocket wheel 48 thus keying or clutching the shaft and wheel together and revolving shaft 45 and in one revolution of said shaft tipping the box 23 from the charging position to the discharging position, when the material therein falls out into the hopper 41, and back to the charging position, as will be readily understood. As shaft 45 is revolving, collar 82 and pin 81 are being revolved with it and when pin 81 strikes pin 80 the catch 77 is swung on its pivot releasing lever 53 which then falls under the influence of the weight 54 rocking rock shaft 49 and swinging the clutch stop 55 into the path of movement of the clutch arm 70. When the clutch arm 70 reaches the clutch stop 55 the clutch arm 70 is forced inwardly, the spring 73 is compressed and the clutch 67 is rotated so as to move the part 76 thereof back into the semicylindrical bore 63 in the shaft 45 and the sprocket wheel 48 is no longer keyed or clutched to the shaft and can continue its movement without revolving the shaft. When the hopper 2 of the scale has discharged its contents it will rise and rod 13 will fall back to its initial position below crank arm 52, and the same cycle of operations will be repeated.

While this specification and the drawings describe and illustrate specific forms of mechanism, I do not confine my invention to the specific forms of mechanism disclosed, but

What I claim is:

1. The combination with a movable member of an automatic weighing scale, of a measuring box, means to feed material into said measuring box, means to tip said measuring box to receive a charge of material and to discharge material therefrom, and means operable by the movable member of said automatic weighing scale to cause the measuring box to be tipped.

2. The combination with a movable member of an automatic weighing scale, of a measuring box, means to feed material into said measuring box, means to tip said measuring box to receive a charge of material and to discharge material therefrom, and means operable by the movable member of said automatic weighing scale to cause the measuring box to be tipped from the filling position to the discharging position and back to the filling position for each movement in one direction by the said movable member of said automatic weighing scale.

3. The combination with a movable member of an automatic weighing scale, of a measuring box, means to feed material into said measuring box, means for supporting said measuring box so that it may be tipped from a charging position to a discharging position and back to the charging position, means adapted to be driven continuously to tip said measuring box, and clutch mechanism adapted to control by the movable member of said automatic weighing scale to cause said continuously driven means to tip said measuring box intermittently.

4. The combination with a movable member of an automatic weighing scale, of a measuring box, means to feed material into said measuring box, means for supporting said measuring box so that it may be tipped from a charging position to a discharging position and back to the charging position, means adapted to be driven continuously to tip said measuring box, a shaft provided with a crank, a connecting rod connected to said crank and said measuring box, and clutch mechanism adapted to clutch together said shaft and said continuously driven means, said clutch mechanism being adapted to be operated by the movable member of said automatic weighing scale.

5. The combination with a movable member of an automatic weighing scale of a tiltable measuring box, means to feed material into said measuring box, a movable bottom in said measuring box to vary the free volume capacity thereof, means to tip said measuring box from the charging position to the discharging position and back to the charging position, and means controlled by the movable member of said automatic weighing scale to control the tipping of said measuring box.

6. The combination with a movable member of an automatic weighing scale of a tiltable measuring box, means to feed material into said measuring box, a shaft provided with a crank thereon, a connecting rod connecting said shaft and said measuring box to tilt said measuring box from its charging position to its discharging position and back to its charging position for one revolution of said shaft and crank, a sprocket wheel freely mounted on said shaft and adapted to be driven continuously from some suitable source of power supply, a clutch member adapted to clutch said shaft and said sprocket wheel together, a rock shaft provided with a crank arm and a clutch stop, the said rock shaft being disposed at substantially a right angle with said first mentioned shaft so that said clutch stop will be rocked in line with said first mentioned shaft to cause the clutch stop to engage the clutch or to be disengaged therefrom, the said crank arm extending into the path of movement of the movable member of the said automatic weighing scale, so that the rock shaft will be rocked by a movement of said member.

7. The combination with a movable member of an automatic weighing scale of a tiltable measuring box, means to feed material into said measuring box, a shaft provided with a crank thereon, a connecting rod connecting said shaft and said measuring box to tilt said measuring box from its charging position to its discharging position and back to its charging position for one revolution of said shaft and crank, a sprocket wheel freely mounted on said shaft and adapted to be driven continuously from some suitable source of power supply, a clutch member adapted to clutch said shaft and said sprocket wheel together and provided with an arm extending in a radial plane from said shaft, a rock shaft disposed at substantially a right angle with said first mentioned shaft and provided with a crank arm, a clutch stop and a lever provided with a weight severally projected in a radial direction from said rock shaft, a gravity catch to engage with the lever on the rock shaft to retain said lever and the weight thereon in an elevated position, the said crank arm extending into the path of movement of the movable member of the said automatic weighing scale so that the rock shaft will be rocked by a movement of said member to swing the clutch stop away from the arm of said clutch and to lift the lever provided with a weight into a position to be caught and held by said gravity catch, and a pin carried by said first mentioned shaft and in advance of the arm of said clutch adapted to engage with said catch to release said lever to permit the weight carried by said lever to rock the rock shaft and swing the clutch stop back into the path of rotation of the arm of said clutch.

In witness whereof I hereto affix my signature in presence of two witnesses.

HENRY WILLIAM WELSH.

Witnesses:
 CHAS. L. GOSS,
 FRANK E. DENNETT.

Copies of this patent may be obtained for five cents each, by addressing the "Commissioner of Patents, Washington, D. C."